United States Patent [19]
Royball

[11] Patent Number: 5,224,246
[45] Date of Patent: Jul. 6, 1993

[54] ROPE FASTENING DEVICE

[76] Inventor: John G. Royball, 1172 McKinley St., Redwood City, Calif. 94061

[21] Appl. No.: 781,019

[22] Filed: Oct. 18, 1991

[51] Int. Cl.⁵ .............................................. F16G 11/00
[52] U.S. Cl. ................................ 24/129 R; 24/129 B; 24/130
[58] Field of Search ............ 24/129 R, 129 A, 129 B, 24/129 D, 130, 136 R, 136 K, 115 H, 115 K

[56] References Cited

U.S. PATENT DOCUMENTS

| | | | |
|---|---|---|---|
| 656,431 | 8/1900 | Stewart | 24/129 A |
| 912,387 | 2/1909 | Landry | 24/129 R |
| 958,168 | 5/1910 | Petersen | 24/129 B |
| 1,231,309 | 6/1917 | Stout | 24/130 |
| 1,611,329 | 12/1926 | Barnes | 24/129 B |
| 1,613,635 | 1/1927 | Zimmerlund | 24/129 B |
| 3,238,585 | 3/1966 | Froyd | 24/129 B |
| 3,930,288 | 1/1976 | Black et al. | 24/129 R |
| 3,949,487 | 4/1976 | Bartram et al. | 24/129 R |
| 4,774,742 | 10/1988 | Johnson | 24/129 R |
| 4,936,532 | 6/1990 | Williams | 24/130 |
| 4,941,434 | 7/1990 | Ellwanger | 24/129 B |

FOREIGN PATENT DOCUMENTS 0001894 of 1895 United Kingdom ................. 24/130

*Primary Examiner*—Victor N. Sakran
*Attorney, Agent, or Firm*—Rosenblum, Parish & Isaacs

[57] ABSTRACT

Rope Fastening Device including a generally flat member having a rope passage slot formed therethrough. The end portions of the device is shaped into rope attachment posts which are utilized to loop portions of the rope thereabout.

5 Claims, 2 Drawing Sheets

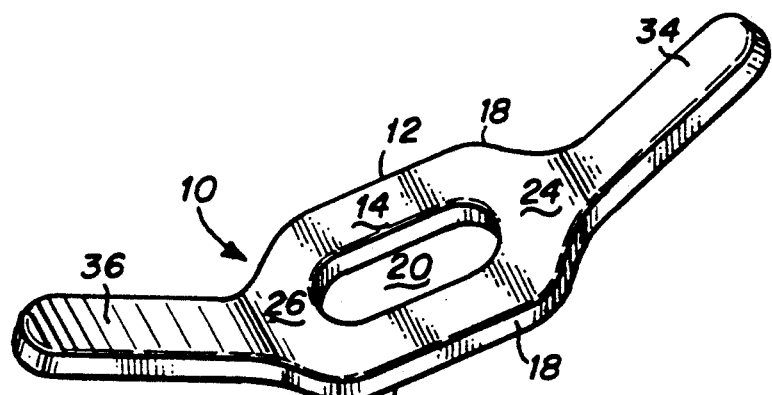
Fig_1
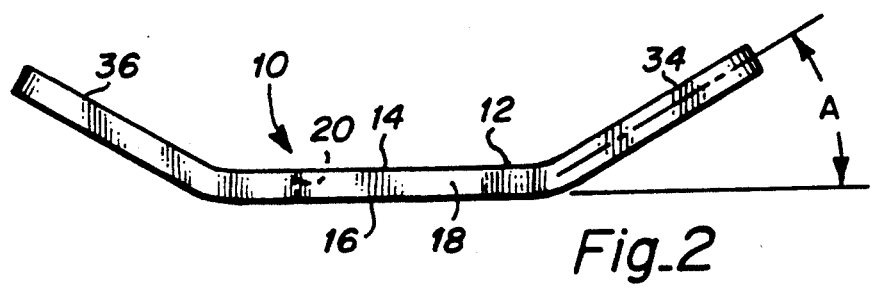
Fig_2
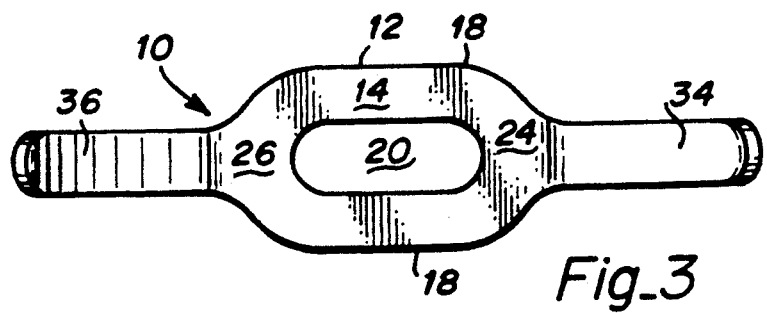
Fig_3
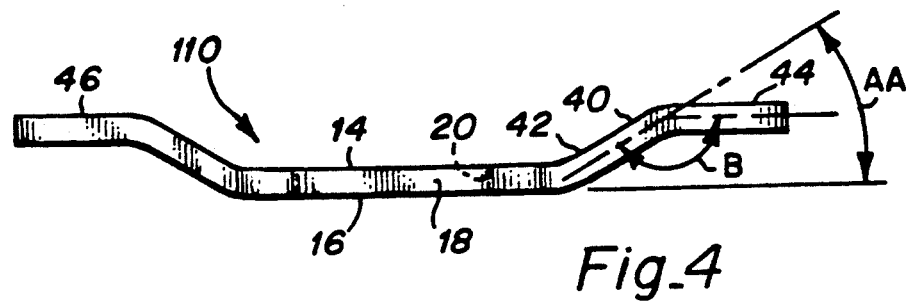
Fig_4

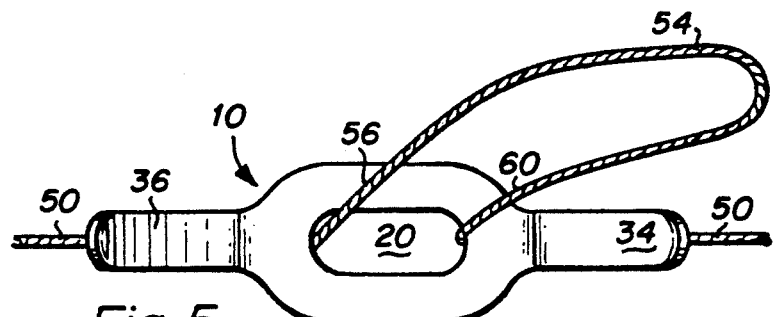
Fig_5
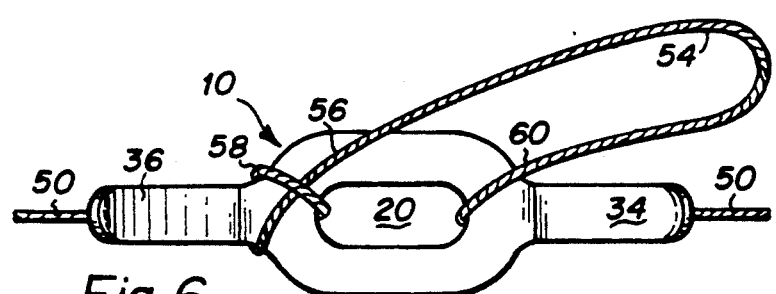
Fig_6
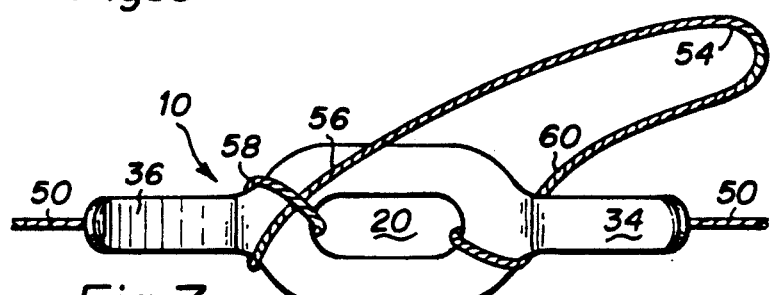
Fig_7
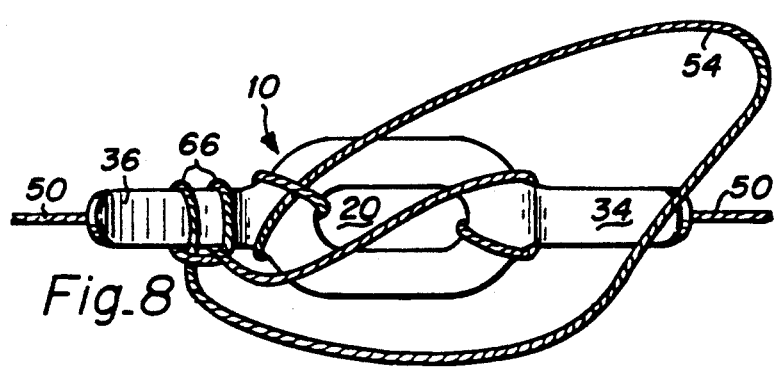
Fig_8
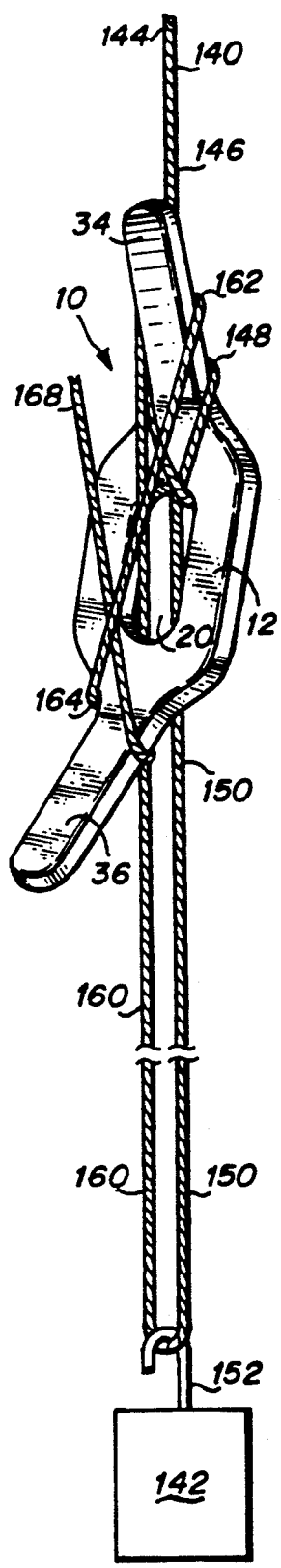
Fig_9

ROPE FASTENING DEVICE

BACKGROUND OF THE INVENTION

1. Field of the Invention

The present invention relates generally to rope fastening devices and in particular to devices that aid in securely fastening a load utilizing a rope.

2. Brief Description of the Prior Art

Generally, devices similar to the present invention are known in the prior art. One such device is taught by U.S. Pat. No. 1,611,329, issued Dec. 21, 1926 to W. J. Barnes, entitled "Rope Holding Means". This device includes a flat member having two slots formed transversely therethrough. The body portion of the rope is depressed into each slot and the end 1S of the rope is passed through each depressed portion. When the load is applied to the loop it tightens up the depressed portions against the end portion of the rope that was passed through the depressions. The frictional engagement and pressure between the rope portions within the slots serves to secure the end of the rope and support the load.

Other prior art known to the inventor includes U.S. Pat. No. 656,431, issued Aug. 21, 1900 to F. H. Stewart entitled "Cord Adjuster for Electric Lights"; U.S. Pat. No. 4,393,549, issued Jul. 19, 1983 to Ignazio Leonardo, entitled "Support Clip for a Dropwire or the Like"; and U.S. Pat. No. 4,939,820, issued Jul. 10, 1990 to Martin P. Babcock, entitled "Rope Fastener". While the disclosures of these patents are relevant, it is believed that the Barnes patent depicts the most significant prior art.

SUMMARY OF THE INVENTION

It is an object of the present invention to provide a unitary rope fastening device which is simple to manufacture and easy to use.

It is another object of the present invention to provide a unitary rope fastening device that is formed with an extended rope attachment post portion to aid in the securement of the rope.

It is a further object of the present invention to provide a unitary rope fastening device that includes a rope passage 11 slot formed therethrough, whereby the slack in a rope tied at each end can be easily pulled through to tighten the rope about a load.

It is yet another object of the present invention to provide a unitary rope fastening device that is held in place by a first looped portion of the body of the rope while the load is secured and the end of the rope is joined to the device.

The rope fastening device of the present invention is a generally flat member having a rope passage slot formed therethrough. At least one end portion of the device is shaped into a rope attachment post which is utilized to loop portions of the rope thereabout. The device may be utilized in various ways with regard to the securing a rope about a load. In one mode of utilization, the ends of a rope may be secured about a load with significant slack in the rope, and the device is utilized to securely take up the slack. In this mode, a loop is formed in the rope and pushed through the rope attachment slot. One portion of the loop is secured to a rope attachment post and the other portion of the loop is pulled tightly against the load. Thereafter, the loop is secured to the rope attachment posts to effectively take up the slack in the rope and create a firm, tight engagement of the rope, thus securing the load. In another engagement mode, the device is utilized to engage the end of a rope to a body of the rope. In this mode, a loop is formed in the body portion of the rope, which loop is passed through the slot and over and around the rope attachment post. A load attachment loop is formed in the lower portion of the rope and the end of the rope is brought through the slot and secured around the post.

It is an advantage of the present invention that it provides a unitary rope fastening device which is simple to manufacture and easy to use.

It is another advantage of the present invention that it provides a unitary rope fastening device that is formed with an extended rope attachment post portion to aid in the securement of the rope.

It is a further advantage of the present invention that it provides a unitary rope fastening device that includes a rope passage slot formed therethrough, whereby the slack in a rope tied at each end can be easily pulled through to tighten the rope about a load.

It is yet another advantage of the present invention that it provides a unitary rope fastening device that is held in place by a first looped portion of the body of the rope while the load is secured and the end of the rope is joined to the device.

The foregoing and other objects, features and advantages of the present invention will become apparent to one skilled in the art from the following description of the preferred embodiment which makes reference to the several FIGURES of the drawing.

IN THE DRAWING

FIG. 1 is a perspective view of the present invention;

FIG. 2 is a side elevational view of the present invention;

FIG. 3 is a top plan view of the present invention;

FIG. 4 is a side elevational view of an alternative embodiment of the present invention;

FIG. 5 the present invention as utilized to take up the slack in a rope that is engaged at both ends in a first stage of the securement;

FIG. 6 depicts the present invention as utilized to take up the slack in a rope that is engaged at both ends in a second stage of the securement;

FIG. 7 depicts the present invention as utilized to take up the slack in a rope that is engaged at both ends in a third stage of the securement;

FIG. 8 depicts the present invention as utilized to take up the slack in a rope that is engaged at both ends in a final stage of the and securement; and FIG. 9 depicts the present invention as utilized in an alternative mode to facilitate the attachment of the end of a rope to a load.

DETAILED DESCRIPTION OF THE PREFERRED EMBODIMENT

The preferred embodiment of the rope fastening device of the present invention is depicted in FIGS. 1, 2 and 3, wherein FIG. 1 is a perspective view, FIG. 2 is a side elevational view and FIG. 3 is a top plan view. As depicted in FIGS. 1, 2 and 3, the present invention lo is a solid, unitary member. It is preferably formed from a strong metal, although it can also be formed from wood, plastics and composite materials. The device 10 has a generally flat base portion 12 having an upper surface 14, a lower surface 16 and side edges 18. A generally oval rope passage slot 20 is centrally formed through the base portion 12 from the top surface 14 to the bottom surface 16. The elongated body portion 12 has two end portions 24 and 26 which are defined by the inwardly tapering edges 18 of the body portion 12. In the preferred embodiment, each of the end portions 24 and 26 terminates in an outwardly extending rope attachment post 34 and 36 respectfully. Each rope attachment post 34 and 36 is generally long and narrow and extends outwardly a distance sufficient to permit the looping of at least one rope width therebehind.

In the preferred embodiment, each of the rope attachment posts 34 and 36 is bent upwardly (as is best seen in FIG. 2) out of the plane of the body portion 12 of the device 10. In the preferred embodiment, the angle A of inclination of the rope attachment posts is approximately 30 degrees; however, it is within the contemplation of the invention that the rope attachment posts 34 and 36 may be formed in the same plane as the base portion 12 (an angle of 0° degrees) through an angle of inclination of approximately 90 degrees. With particular regard to the present invention as adapted for a rope having a diameter of ⅛ to ½ inches, a suitable embodiment of the present invention may be formed having a body width of 1¼ inches, a body length of 2 inches, a thickness of 3/16 of an inch, a rope engagement slot with a width of 5/8 inches and a slot length of 1¼ inches, and two rope attachment posts each having a length of 1½ inches and a width of ⅜ inches; the preferred material is stainless steel.

An alternative embodiment 110 of the present invention having an alternative rope attachment post configuration 40 is depicted in FIG. 4. As seen in FIG. 4, the alternative rope attachment post 40 has a first segment 42 having a first angle of inclination AA of approximately 30 degrees, and a second segment 44 having a bend angle B of approximately 150 degrees formed within the length of post 40, such that the second segment 44 of the post 40 is generally parallel with the surface 14 of the base 12. This alternative embodiment post 40 provides a generally similar functional advantage as does the straight post 34.

A first mode for the utilization of the present invention 10 in the attachment of a rope to secure a load is depicted in FIGS. 5, 6, 7 and 8. As depicted therein, a rope 50 has two ends (not shown) that are firmly attached so as to secure a load (not shown). The rope 50 is loosely attached, such that slack exists in the rope. As depicted in FIG. 5, the slack in the rope is formed into a loop 54 that is pulled through the slot 20, such that the slack in the rope 50 is taken up within the loop 54. Thereafter, as depicted in FIG. 6, one portion 56 of the loop 54 is formed into a half-hitch 58 that is tied about the rope attachment post 36. This half-hitch 58 firmly secures the rope 50 to the device 10. Thereafter, the other portion 60 of the loop 54 is pulled tight against the secured end of the rope 50. Thereafter, as depicted in FIG. 7, a segment 62 of the portion 60 is passed under the other rope attachment post 34 while holding the rope tightly against the ends. Finally, as depicted in FIG. 8, the portion 60 of the loop 54 is pulled over and secured in a full-hitch 66 to the rope attachment post 36 to secure the rope 50 about the load. It is therefore to be understood that the device 10 has been inserted into the slack body of a rope 50 that is tied at both ends to firmly and easily take up the slack in the rope 50, whereby the load is secured.

A second mode for the utilization of the present invention 10 for the attachment of a rope 140 to a load 142 is depicted in FIG. 9. The upper end 144 of the rope 140 is attached to a hoist for other object (not shown). The downwardly passing portion 146 of the rope 140 is formed into a loop 148 that is inserted through the rope passage slot 20 and looped over the upper rope attachment post 34, such that the downwardly depending portion 150 of the rope passes downward to a hook 152 or other device which is a part of the load 142. The end portion 160 of the rope 140 is pulled taut against the load and then passed upwardly through the slot 20. A loop 162 is formed around the upper rope attachment post 34, followed by a further loop 164 around the lower rope attachment post 36. The end 168 of the rope 140 may be successively looped around the two rope attachment posts to assure its attachment to the device 10. It is therefore to be understood that the device 10, when used as depicted in FIG. 9, provides a replacement for a knot that could have been tied in the rope; however, it is easier to utilize and to untie than a knot. Additionally, owing primarily to the loop 148, the device 10 tends to remain in a fixed location and to resist slippage down the rope as many knots will do.

While the invention has been particularly shown and described with reference to certain preferred embodiments, it will be understood by those skilled in the art that various alterations and modifications in form and detail may be made therein. Accordingly, it is intended that the following claims cover all such alterations and modifications as may fall within the true spirit and scope of the invention.

What I claim is:

1. A rope fastening device, comprising:
   a unitary member having a body portion;
   said body portion having a length that is generally equal to its width and a relatively small thickness;
   an elongated slot being formed through said body portion, said slot having a length that is substantially greater than its width; said width of said slot being sufficient to permit the passage of a rope loop therethrough;
   said body portion having an upper end portion and a lower end portion;
   said upper end portion being shaped as a generally elongated rope attachment post means;
   said lower end portion being shaped as a generally elongated rope attachment post means;
   each said post means being integrally formed with said end portion and projecting outwardly from said body portion to form an elongated, generally narrow member, and each said post means being adapted to hold a portion of said rope that is wrapped around said post means;
   wherein said body portion is disposed in a plane, and wherein each of said post means are bent in an angle of inclination out of said plane.

2. A rope fastening device as described in claim 1 wherein said angle of inclination is from 0 degrees to 90 degrees.

3. A rope fastening device as described in claim 2 wherein said angle of inclination is approximately 30 degrees.

4. A rope fastening device as described in claim 1 wherein a first segment of said post means is disposed at a first angle relative to said body portion, and a second segment of said post means is disposed at a second angle relative to said first segment.

5. A rope fastening device as described in claim 4 wherein said first angle is approximately 30 degrees and said second angle is approximately 150 degrees.

* * * * *